United States Patent Office 3,317,275
Patented May 2, 1967

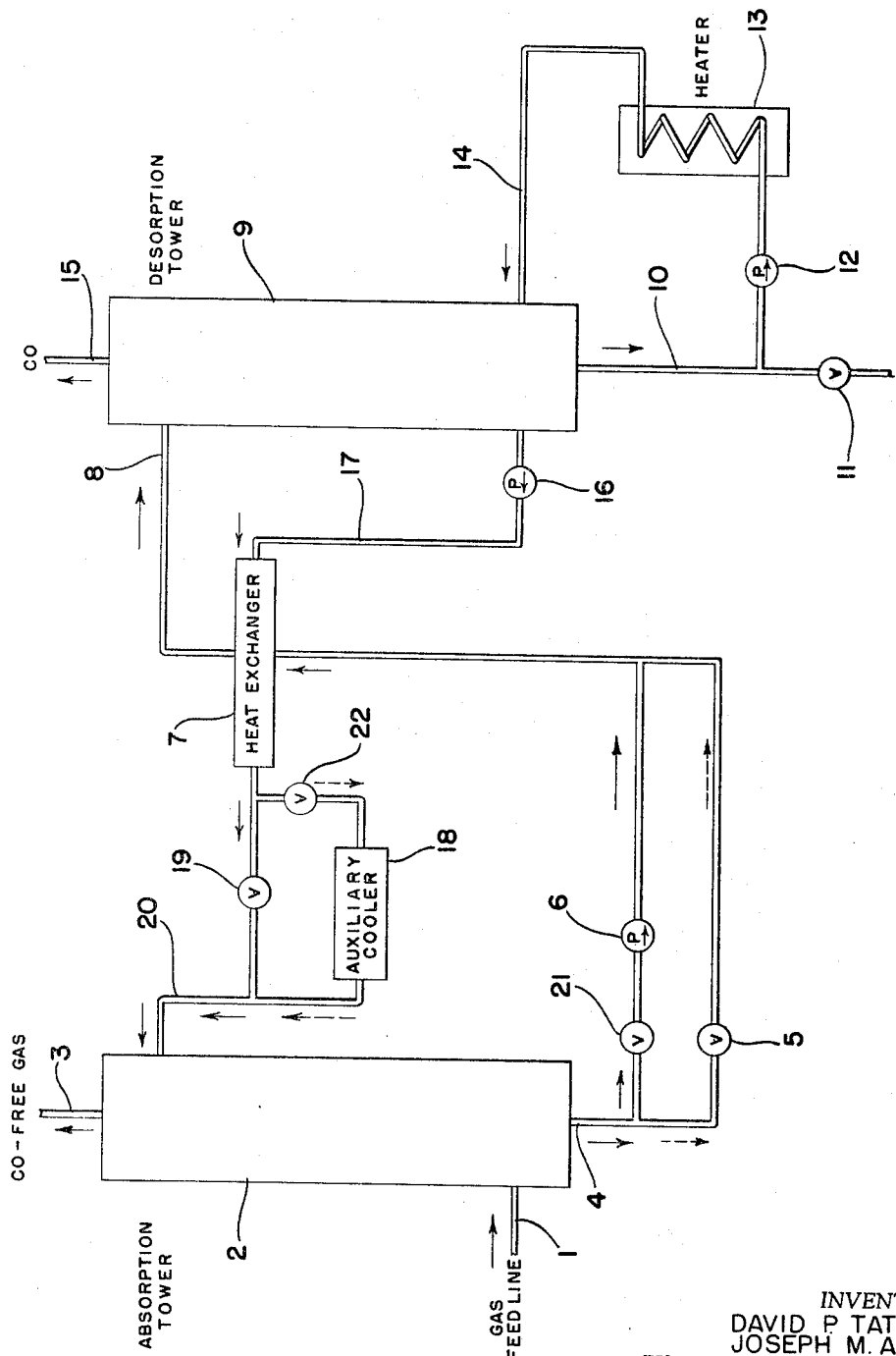

3,317,275
PROCESS FOR REMOVING CARBON MONOXIDE FROM GASES
David P. Tate, Northfield, and Joseph M. Augl, Bedford, Ohio, assignors to The Standard Oil Company, Cleveland, Ohio, a corporation of Ohio
Filed Dec. 10, 1962, Ser. No. 243,411
3 Claims. (Cl. 23—2)

This invention relates to a process for removing carbon monoxide from mixed gas streams. The process has many applications. Among its uses are purification of hydrogen by carbon monoxide removal, the production of tonnage quantities of pure carbon monoxide, and removal of carbon monoxide from town gas.

In making industrial gases, such as synthesis gas, carbon monoxide is generally produced as a co-product with hydrogen. However, many hydrogen-treating processes use metal catalysts that are poisoned by the presence of carbon monoxide. Therefore, it is necessary to purify the hydrogen by removing the carbon monoxide to prevent the poisoning of the catalysts. Such processes are ammonia synthesis and hydrorefining. Alternatively, for some uses, such as phosgene and acrylate synthesis, it is necessary, first, to separate the hydrogen from the carbon monoxide. In areas where natural gas is not available, town gas is used. The presence of a large amount of carbon monoxide in town gas makes it highly toxic to humans; for this reason, it is desirable to reduce the carbon monoxide content substantially.

The novel process of this invention is based on the discovery that a metal carbonyl in a specific type of complexing compound is in dynamic equilibrium with carbon monoxide. The equilibrium can be shifted easily by variation of temperature or carbon monoxide pressure. When heated, the solution of metallo carbonyl rapidly evolves carbon monoxide in a step-wise reaction, and when cooled, rapidly reabsorbs carbon monoxide. It is the uniquely facile reversibility of these metallo carbonyl complexes to evolve and reabsorb carbon monoxide over a relatively narrow temperature range that forms the basis of the carbon monoxide removal or recovery system of this invention.

The reversible reaction that occurs when carbon monoxide is absorbed and desorbed is as follows:

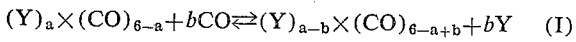
$$(Y)_a X (CO)_{6-a} + bCO \rightleftarrows (Y)_{a-b} X (CO)_{6-a+b} + bY \quad (I)$$

where Y is a coordinating compound selected from the group consisting of organic compounds of nitrogen, phosphorus, sulfur, and oxygen capable of donating at least one pair of electrons to the metal;
X is a metal selected from the group consisting of chromium, molybdenum, and tungsten;
$a$ is an integer of one to three inclusive;
$b$ is an integer not greater than $a$.

The organic compound Y may be any organic chemical coordinating compound that has the capacity to donate a pair of electrons. This class of compounds is well-known to those skilled in the art of metallo-organic complexes.

The novel system of this invention has many inherent advantages. It presents the choice of a wide variety of complexing metallo carbonyls, and of concentrations of these metallo carbonyls. All of these factors lend themselves to systematic development to the highest degree of efficiency by resorting to variations in temperature, pressure, throughput, and circulation rate based on the amount of the carbon monoxide to be removed or recovered from the mixed gas stream, and on the ultimate use of the gas stream.

The preferred coordinating compounds are the nitrogen-containing compounds which can donate a pair of electrons. These include the amides, such as acetamide, N,N-dimethyl acetamide, dimethyl formamide, N,N-dimethyl caproic amide, 2-pyrrolidone, N-methyl 2-pyrrolidone, and caprolactam; the amines, such as ethylene diamine, trimethylene diamine, propyl amine, n-butyl amine, aniline, dimethyl aniline; the nitriles, such as the saturated nitriles acetonitrile, propionitrile, butyronitrile, isobutyronitrile; olefinically unsaturated nitriles, such as acrylonitrile, 3-butene nitrile; aromatic nitriles, such as benzonitrile, phenylacetonitrile; dinitriles, such as adiponitrile, succinonitrile, malononitrile, phthalonitrile, 1,2-dicyanocyclobutane; and other nitrogen compounds, such as pyridine, quinoline, amino acids, azobenzene, etc. All these compounds have from 2 to 12 carbon atoms and the number of carbon atoms which generally increase the boiling point with an increase in number is an effective variable for varying the temperature and pressure at which the adsorption and desorption will take place.

The metals that may be used as the component of the metallo carbonyl are chromium, molybdenum, and tungsten. Molybdenum is the preferred metal because of a more favorable rate of reaction.

When the complexing compound is a liquid of convenient viscosity and boiling point, an excess amount of it may serve as the solvent. Otherwise, an insert solvent may be used, such as water, ketones, such as acetone, methyl ethyl ketone; alcohols, such as methanol, ethanol, isopropyl alcohol, etc.; hydrocarbons, such as n-heptane, n-hexane, n-octane, cyclohexane, etc.; ethers, such as diisopropyl ether, dipropyl ether, diisobutyl ether, etc.; and other commonly recognized solvents.

The process may be operated by shifting the equilibrium; this is accomplished by altering either pressure or temperature, or a combination of both. Increasing the temperature shifts the equilibrium to the right, as shown in Equation I on page 2. Increasing the pressure shifts the equilibrium to the left. The temperatures will be within the range of 20° C. to 250° C. and the pressure from atmospheric to 5000 p.s.i.g. Optima operating conditions are dependent on many factors; i.e., the complexing system used, the composition and the pressure of the gas streams being treated, and the ultimate use of the gas recovered, as one skilled in the art of gas absorption and desorption will realize.

The apparatus suitable for practicing the invention is shown in the sole figure. It consists of the mixed gas feed line 1 entering the absorption tower 2 where the absorption solution takes up the carbon monoxide from the mixed gas. The tower may be of the conventional bubble-tray type, a packed column, or any other liquid gas-contacting apparatus. Line 3 at the top of the absorption tower 2 permits removal of the gas of reduced carbon monoxide content. Line 4 at the bottom of the absorption tower 2 conducts the carbon monoxide-enriched solution out of the absorbing tower 2. If the pressure in the absorption tower 2 is higher than the pressure in the rest of the system, the valve 5 is opened allowing the solution to pass to the heat exchanger 7. If the pressure is equal to or less than the pressure of the rest of the system, valve 21 is opened and valve 5 is closed and the pump 6 forces the solution to the heat exchanger 7. Line 8 conducts the solution to the desorption tower 9. Line 10 may be used to conduct the solution through the heater 13. Valve 11 may be opened to remove any insoluble material in the system. Pump 12 forces the solution to the heater 13 where the temperature of the solution is raised to the degree necessary to evolve the carbon monoxide if the temperature differential is employed to shift the equilibrium. The solution is returned to the desorption tower 9 through line 14. The carbon monoxide is evolved in the desorption tower 9 and is removed through line 15. The carbon monoxide-absorbing solution is forced by pump 16 through line 17 to the heat exchanger 7. If the solution temperature must be lower, valve 22 is opened and the solution passes to an auxiliary cooler 18. If the temperature is satisfactory, the valve 19 is opened to permit the solution to pass through line 20 into the absorption tower 2 and the cycle is continued. Make-up solution of the metallo carbonyl and the organic compound of nitrogen, phosphorus, sulfur or oxygen capable of donating at least one pair of electrons to the metal may be added to the system at valve 11.

An isobaric process exists when the pressure is the same in both the absorption and desorption towers. Under these conditions, the desorption tower is operated at a higher temperature than the absorption tower 2. In such a system the heater 13 and the two pumps 6 and 16 and the auxiliary cooler 18 are required.

An isothermal process exists when both the absorption 2 and desorption 9 towers are maintained at the same temperature and a pressure cycle is used to make the system operable. Under these conditions, one pump 16 is used and only enough heat to maintain the system temperature is required. Should the system be run isothermally below the ambient temperature, the auxiliary cooler 18 is required. Under these conditions, the absorption tower 2 is operated at a higher pressure than the desorption tower 9. The valve 5 is opened to discharge the carbon monoxide-enriched solution to the desorption tower. The solution is forced by pump 16 from the lower pressure desorber 9 to the higher pressure absorber 2.

A third variation of the process exists where the absorption tower 2 is operated at a higher pressure and a lower temperature than the desorption tower 9. The carbon monoxide-enriched solution is discharged into the lower pressure desorption tower by opening the valve 5. The heater 13 furnishes heat to the desorption tower 9 causing carbon monoxide to be evolved. The absorbing solution is then pumped from the low pressure desorption tower 9 by pump 16 through the heat exchanger 7 and the auxiliary cooler 18 to the higher pressure absorption tower 2.

A preferred embodiment of the invention follows, but it is not intended, however, that it limit the invention in any way.

In a commercial operation where hydrogen gas is to be used for ammonia synthesis, the hydrogen gas containing from 1 to 5% of the undesired carbon monoxide available at two thousand pounds pressure per square inch is fed into an absorption tower 2 through feed line 1. The absorption tower 2 is operated at 20° C. and 2000 pounds per square inch. The carbon monoxide containing hydrogen gas countercurrently contacts the absorbing solution and the carbon monoxide is absorbed. The hydrogen gas of lowered carbon monoxide content is recovered at the top of the absorption tower 2 through line 3. The carbon monoxide-enriched absorption solution passes from the absorption tower 2 through line 4. Valve 5 is opened to discharge the solution to the heat exchanger 7. The solution then passes through line 8 to the desorption tower 9. Valve 11 may be opened to remove insoluble material built up in the system. The solvent propionitrile containing 10% by weight of molybdenum carbonyl complex may be added at this point. Some of the solution is circulated by pump 12 through the heater 13 where heat is applied to raise the temperature to the degree required to evolve the carbon monoxide—in this instance, it is 100° C. The heated solution passes back through line 14 into the desorption tower 9. The desorption tower is maintained at 100° C. and the evolved carbon monoxide is removed through line 15. The carbon monoxide-depleted solution now capable of absorbing carbon monoxide is forced by pump 16 through line 17 to the heat exchanger 7. The temperature of the carbon monoxide-absorbing solution is reduced from the operative temperature of carbon monoxide desorption which, in this instance, is 100° C. and is cooled by the stream coming from the absorption tower 2.

The following data show how one skilled in the art may develop commercial systems.

EXAMPLE 1

Thirty grams of molybdenum hexacarbonyl and 250 milliliters of propionitrile were placed in the desorber and another 250 milliliters of propionitrile were placed in the absorber. The material in the desorber was refluxed several hours until no more carbon monoxide gas was evolved. The solution was circulated at a rate of 10 to 50 milliliters per minute. The absorber was maintained at room temperature and the desorber at the reflux temperature of propionitrile. Pure carbon monoxide was fed into the absorber at a rate of 32 milliliters per minute and dispersed in the liquid. At these rates, all the carbon monoxide was absorbed and no gas came out the absorber gas outlet, while carbon monoxide gas was evolved at a rate of 31±3 milliliters per minute at the desorber gas outlet.

A more rapid method for measuring the effectiveness of the reversible absorption-desorption of carbon monoxide by the metal carbonyl-complexing solvent system was developed. In this method, a 0.02 mole sample of molybdenum hexacarbonyl was placed in a 100 milliliter three-necked flask fitted with a reflux condenser and a gas-measuring buret. The system was flushed with nitrogen and 15 milliliters of the complexing solvent were added to the flask with a hypodermic syringe. The material was heated until no more carbon monoxide was evolved. The mixture was cooled and kept in a nitrogen atmosphere until used for the carbon monoxide absorption studies. Five milliliters of the solution were transferred to a 15-milliliter stainless steel autoclave. A carbon monoxide-hydrogen mixture was introduced at the desired pressure. After shaking for a time, the remaining gas atmosphere was analyzed for carbon monoxide content chromatographically and by infrared.

EXAMPLE 2

A charge of 26.4 grams of molybdenum hexacarbonyl and 300 milliliters of isobutyronitrile was placed in the desorber.

The mixture was refluxed until 6.72 liters of carbon monoxide gas had evolved. Twenty milliliters of the solution were transferred to a 100-milliliter autoclave pressured to 1500 pounds per square inch with hydrogen gas containing 230 parts per million of carbon monoxide. The autoclave was shaken for three hours. Infrared spectroscopic analysis showed that 1 to 2 parts per million of carbon monoxide remained unabsorbed.

EXAMPLE 3

A charge of 5.36 grams of molybdenum hexacarbonyl and 22 milliliters of propionitrile was placed in the desorber and refluxed until 1100 milliliters of carbon dioxide had evolved. A 5-milliliter portion of the solution was placed in a 15 milliliter autoclave and the pressure was raised to 1000 pounds per square inch with hydrogen gas that contained 2% carbon monoxide. The autoclave was shaken for three hours and both the residual and the absorbed gas were analyzed with the Burrell Kromo-Tog. The amount of carbon monoxide in the residual gas was 200 parts per million.

EXAMPLE 4

A charge of 5.36 grams of molybdenum hexacarbonyl and 22 milliliters of propionitrile was placed in the desorber and refluxed until 1100 milliliters of carbon dioxide had evolved. A 5-milliliter portion of the solution was placed in a 15 milliliter autoclave and the pressure was raised to 1000 pounds per square inch with hydrogen gas that contained 2% carbon monoxide. The autoclave was shaken for 16 hours. The residual unabsorbed gas was analyzed by Burrell Kromo-Tog. The carbon monoxide remaining in the gas was 130 parts per million.

EXAMPLE 5

Five milliliters of acetonitrile that contained 0.004 mole of trisacetonitrile molybdenum tricarbonyl were discharged into a 15-milliliter autoclave. The pressure was raised to 2000 pounds per square inch with hydrogen gas that contained 2% carbon monoxide. The autoclave was shaken for three hours. The residual unabsorbed gas was analyzed by the Burrell Kromo-Tog. The carbon monoxide remaining in the gas was 240 parts per million.

EXAMPLE 6

Five milliliters of propionitrile that contained 0.0067 mole of trispropionitrile molybdenum tricarbonyl were discharged into a 15-milliliter autoclave. The pressure was raised to 2000 pounds per square inch with hydrogen gas that contained 2% carbon monoxide. The autoclave was shaken for 23 hours. The residual unabsorbed gas was measured by Burrell Kromo-Tog. No carbon monoxide was detected indicating a concentration of less than 20 parts per million.

EXAMPLE 7

A charge of 5.26 grams of molybdenum hexacarbonyl and 30 milliliters of normal butyronitrile was refluxed for two hours to evolve the carbon monoxide. Five milliliters of the solution were placed in a 15-milliliter autoclave. The pressure was raised to 2000 pounds per square inch with hydrogen gas that contained 2% carbon monoxide. The autoclave was shaken for three hours. The residual unabsorbed gas was measured by Burrell Kromo-Tog. The carbon monoxide remaining in the gas was 200 parts per million.

EXAMPLE 8

A charge of 4.4 grams of chromium carbonyl and 50 milliliters of acetonitrile were refluxed for several days. Carbon monoxide in the amount of 1.3 liters was evolved. The material was cooled, shaken, and exposed to one atmosphere of carbon monoxide. .89 liter of carbon monoxide was absorbed.

EXAMPLE 9

A charge of 7 grams of tungsten carbonyl and 50 milliliters of acetonitrile were refluxed for several days. The carbon monoxide evolved was 1.3 liters. After cooling and shaking, the material was exposed to one atmosphere of carbon monoxide and .89 liter of carbon monoxide were absorbed.

EXAMPLE 10

A charge of 5.26 grams of molybdenum hexacarbonyl and 30 milliliters of dimethyl formamide was placed in the desorber. This mixture was refluxed until 1500 milliliters of carbon monoxide were evolved. The material was cooled, shaken and exposed to the pressure of one atmosphere of carbon monoxide. The carbon monoxide was absorbed at the rate of 1000 milliliters per hour until 1360 milliliters had been absorbed.

EXAMPLE 11

A charge of 2.6 grams of molybdenum hexacarbonyl and 15 milliliters of N,N-dimethyl acetamide was placed in a desorber. The material was refluxed for one hour and during this period, 1200 milliliters of carbon monoxide were evolved. The material was cooled, shaken, and then exposed to the pressure of one atmosphere of carbon monoxide. The carbon monoxide was absorbed at the rate of 300 milliliters per hour until 750 milliliters had been absorbed.

EXAMPLE 12

Thirty milliliters of ethylene diamine and 5.26 grams of molybdenum hexacarbonyl were placed in a desorber and refluxed until the carbon monoxide no longer was evolved. The material was cooled, shaken, and then exposed to a pressure of one atmosphere of carbon monoxide gas. The carbon monoxide gas was absorbed at a rate of 50 milliliters per hour until 150 milliliters had been absorbed.

EXAMPLE 13

Thirty milliliters of N,N-dimethyl caproic amide and 5.26 grams of molybdenum hexacarbonyl were placed in a desorber and refluxed until the carbon monoxide no longer was evolved. The material was cooled, shaken, and then exposed to pressure of one atmosphere of carbon monoxide. The carbon monoxide gas was absorbed at a rate of 50 milliliters per hour until 100 milliliters had been absorbed.

EXAMPLE 14

Five grams of molybdenum hexacarbonyl, under a nitrogen atmosphere, and 35 milliliters of acrylonitrile were placed in a desorber and refluxed until 850 milliliters of carbon monoxide were evolved; this is equivalent to two moles of carbon monoxide. The refluxing was stopped and the charge was allowed to reabsorb carbon monoxide. Within five minutes 100 milliliters of carbon monoxide were reabsorbed. Overnight, an additional 340 milliliters of carbon monoxide were reabsorbed. The total amount of carbon monoxide reabsorbed was 440 milliliters or the equivalent of one mole. This mixture was refluxed again until two moles of carbon monoxide were evolved. Altogether three moles of carbon monoxide were evolved. This mixture was then stripped of excess solvent and three grams of red solid were obtained.

EXAMPLES 15–19

A charge of molybdenum carbonyl and solvent were placed in the reactor and refluxed at 120° C. until no more carbon monoxide was evolved. The material was then placed in an autoclave, shaken, and exposed to carbon monoxide at one atmosphere of pressure. The amounts of carbon monoxide absorbed and evolved were measured. The data for the solvents phenylacetonitrile, acetamide, quinoline, pyridine, and 1,2-dicyanocyclobutane appear in Table I.

TABLE I

| Solvent | Solvent, Amt. | Molybdenum Carbonyl, Grams | Carbon Monoxide Evolved at 120° C., ml.[1] | Carbon Monoxide Absorbed, ml. |
|---|---|---|---|---|
| Phenylacetonitrile | 50 ml | 5 | 740 | 140 |
| Acetamide | 2 grams in 50 ml. ethanol | 5 | 700 | 200 |
| Quinoline | 60 ml | 5 | 530 | 140 |
| Pyridine | 45 ml | 5 | 1,140 | 200 |
| 1,2-dicyanocyclobutane | 1.3 grams in 50 ml. ethanol | 5 | 1,200 | 300 |

[1] 470 ml. is the equivalent of one mole of carbon monoxide.

We claim:
1. A process for separating carbon monoxide from a gas containing the same which comprises (1) contacting at a temperature within the range of 20° C. to 250° C. and a pressure of from 0 to 5000 p.s.i.g. said gas with a solution containing a metal carbonyl complex of the formula

$$(Y)_a X(CO)_{6-a}$$

where
 X is a metal selected from the group consisting of chromium, molybdenum, and tungsten;
 Y is a nitrogen-coordinating compound having 2 to 12 carbon atoms, and capable of donating at least one pair of electrons to said metal; and
 $a$ is an integer of one to three, inclusive, whereby carbon monoxide is absorbed by and Y is liberated from said metal carbonyl complex, forming a carbon monoxide-enriched complex having the formula $$(Y)_{a-b} X(CO)_{6-a+b}$$

where
 X, Y, and $a$ are defined as above, and
 $b$ is an integer greater than 0 and not greater than $a$;

and (2) performing on said carbon monoxide-enriched complex at least one of the steps of increasing the temperature and decreasing the pressure used in step (1), whereby carbon monoxide is liberated and said metal carbonyl complex is reformed.

2. A continuous process for separating carbon monoxide from a gas containing the same which comprises (1) contacting at a temperature within the range of 20° C. to 250° C. and a pressure of from 0 to 5000 p.s.i.g. said gas with a solution containing a metal carbonyl complex having the formula $$(Y)_a X(CO)_{6-a}$$

where
 X is a metal selected from the group consisting of chromium, molybdenum, and tungsten;
 Y is a nitrogen-coordinating compound having 2 to 12 carbon atoms, and capable of donating at least one pair of electrons to said metal; and
 $a$ is an integer of one to three, inclusive, whereby carbon monoxide is absorbed by and Y is liberated from said metal carbonyl complex, forming a carbon monoxide-enriched complex having the formula $$(Y)_{a-b} X(CO)_{6-a+b}$$

where
 X, Y, and $a$ are defined as above, and
 $b$ is an integer greater than 0 and not greater than $a$;
(2) removing a stream of carbon monoxide-depleted gas; (3) performing on said carbon monoxide-enriched complex at least one of the steps of increasing the temperature and decreasing the pressure used in step (1), whereby carbon monoxide is liberated and said metal carbonyl complex is reformed; and (4) recycling said metal carbonyl complex to step (1).

3. The process of claim 2 in which said carbon monoxide containing gas consists essentially of from 95–99% $H_2$ and from 5–1% CO.

References Cited by the Examiner

UNITED STATES PATENTS 2,940,832   6/1960   Natta et al. _____ 23—203

OTHER REFERENCES

Blanchard, "The Volatile Metal Carbonyls," Chemical pages 3, 5, 6, 24, 25, 29 and 30 relied upon.

OSCAR R. VERITZ, *Primary Examiner.*

MAURICE A. BRINDISI, *Examiner.*

E. C. THOMAS, *Assistant Examiner.*